United States Patent
Birukov et al.

(10) Patent No.: US 10,235,725 B2
(45) Date of Patent: Mar. 19, 2019

(54) METHOD AND SYSTEM FOR DETERMINING MERCHANT GRATUITY VALUES

(71) Applicant: MasterCard International Incorporated, Purchase, NY (US)

(72) Inventors: Andrey Birukov, Scarsdale, NY (US); Arun Elangovan, Astoria, NY (US); Edward Lee, Scarsdale, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 589 days.

(21) Appl. No.: 14/935,907

(22) Filed: Nov. 9, 2015

(65) Prior Publication Data

US 2017/0132584 A1 May 11, 2017

(51) Int. Cl.
*G06Q 50/12* (2012.01)
*G06Q 20/12* (2012.01)

(52) U.S. Cl.
CPC ............. *G06Q 50/12* (2013.01); *G06Q 20/12* (2013.01)

(58) Field of Classification Search
CPC ........ G06Q 20/32; G06Q 30/02; G06Q 20/34; G06Q 10/06; G06Q 30/00; G06Q 20/22; G06F 17/30; G06F 17/3031
USPC ........ 705/7.39, 1.1, 14.33, 26.7, 32, 39, 347
See application file for complete search history.

(56) References Cited

U.S. PATENT DOCUMENTS

| | | | | |
|---|---|---|---|---|
| 2012/0203632 A1* | 8/2012 | Blum | ................. | G06Q 30/0255 705/14.53 |
| 2013/0080239 A1* | 3/2013 | Okerlund | ........... | G06Q 30/0226 705/14.33 |
| 2013/0246300 A1* | 9/2013 | Fischer | .............. | G06Q 30/0222 705/347 |
| 2014/0200968 A1* | 7/2014 | Yoder | .............. | G06Q 10/06393 705/7.39 |
| 2014/0279299 A1* | 9/2014 | Erenrich | ........... | G06F 17/30312 705/30 |
| 2015/0302388 A1* | 10/2015 | Seidman | ............ | G06Q 20/3224 705/26.7 |
| 2015/0356547 A1* | 12/2015 | Abed | ................. | G06Q 30/0282 705/39 |

* cited by examiner

*Primary Examiner* — Olusegun Goyea
(74) *Attorney, Agent, or Firm* — Buchanan Ingersoll & Rooney PC

(57) ABSTRACT

A method for communicating an index of service performance based on gratuity value includes: storing transaction messages, each including a merchant identifier associated with a merchant involved in the related payment transaction, a transaction amount, and addendum data; receiving a data request including a specific merchant identifier; identifying a subset of transaction messages that includes the specific merchant identifier; identifying a tip amount for each transaction message in the by (i) extracting the tip amount from the addendum date, or (ii) calculating the tip amount based on the transaction amount stored respective transaction message and a transaction amount stored in a matching clearing record; calculating an average gratuity index for a merchant associated with the specific merchant identifier as an average of the identified tip amounts; and transmitting the calculated average gratuity index in response to the data request.

20 Claims, 8 Drawing Sheets

METHOD AND SYSTEM FOR DETERMINING MERCHANT GRATUITY VALUES

FIELD

The present disclosure relates to the determination of merchant gratuity values, specifically the determination of an index of service performance for a merchant based on an average gratuity index and variance gratuity index calculated using tip values determined from electronic transaction messages involving the merchant.

BACKGROUND

For many merchants in service industries, employees may rely on gratuities as part of their regular income. Often times, the value of a gratuity that is provided by a consumer may be heavily affected by the quality of service provided to the consumer. For instance, a consumer at a restaurant may leave a higher gratuity for their server if the server gets their order correct, promptly brings new drinks and refills, and regularly checks in to ensure that the consumer has everything they need. In many of these instances, the gratuity left to a service industry employee is thus highly tied to the level of service provided.

At the same time, when choosing a service provider, many consumers often rely on referrals and reviews of service providers. For example, a consumer selecting a restaurant may view ratings for restaurants and read the reviews of other patrons to decide on where to go. However, many consumers do not leave reviews for merchants that they visit. In addition, consumers may be more often motivated to leave reviews if they have a negative experience rather than a positive one, which may skew the ratings for a service provider. Thus, there is a need for a more improved criteria by which a consumer may gauge a service provider prior to visiting.

The value of gratuities left by consumers at a service provider may be beneficial in providing a consumer with a more accurate estimation of the level and quality of service provided at the service provider. However, such information is often unavailable to consumers. Therefore, there is a need for a technical solution whereby gratuity values for merchant transactions may be captured and used to determine index values by which the level and quality of service at a service provider may be estimated, particularly when benchmarked against the level and quality of service of other service providers.

SUMMARY

The present disclosure provides a description of systems and methods for the communication of indices of service performance for a merchant based on gratuity values.

A method for communicating an index of service performance based on gratuity value includes: storing, in a transaction database of a processing server, a plurality of transaction messages, wherein each transaction message is formatted pursuant to one or more standards and includes a plurality of data elements, including at least a first data element configured to store a merchant identifier associated with a merchant involved in the related payment transaction and a second data element configured to store a transaction amount, and addendum data; receiving, by a receiving device of the processing server, an electrical signal comprising a data request including at least a specific merchant identifier; executing, by a processing device of the processing server, a query on the transaction database to identify a subset of transaction messages where the merchant identifier stored in the first data element corresponds to the specific merchant identifier included in the received data request; identifying, by the processing device of the processing server, a tip amount for each transaction message in the identified subset, wherein identifying the tip amount includes one of: (i) extracting, from the addendum data included in the respective transaction message, the tip amount, or (ii) executing a query on a clearing database of the processing server to identify a clearing record associated with the respective transaction message, and calculating the tip amount based on the transaction amount stored in the second data element included in the respective transaction message and a transaction amount stored in the associated clearing record; calculating, by the processing device of the processing server, an average gratuity index for a merchant associated with the specific merchant identifier as an average of the tip amount identified for each transaction message in the identified subset; and electronically transmitting, by a transmitting device of the processing server, a data signal comprising at least the calculated average gratuity index in response to the received data request.

Another method for communicating an index of service performance based on gratuity value includes: storing, in a transaction database of a processing server, a plurality of transaction messages, wherein each transaction message is formatted pursuant to one or more standards and includes a plurality of data elements, including at least a first data element configured to store a merchant identifier associated with a merchant involved in the related payment transaction and a second data element configured to store a transaction amount, and addendum data; receiving, by a receiving device of the processing server, an electrical signal comprising a data request including at least a specific merchant identifier; executing, by a processing device of the processing server, a query on the transaction database to identify a subset of transaction messages where the merchant identifier stored in the first data element corresponds to the specific merchant identifier included in the received data request; identifying, by the processing device of the processing server, a tip amount for each transaction message in the identified subset, wherein identifying the tip amount includes one of: (i) extracting, from the addendum data included in the respective transaction message, the tip amount, or (ii) executing a query on a clearing database of the processing server to identify a clearing record associated with the respective transaction message, and calculating the tip amount based on the transaction amount stored in the second data element included in the respective transaction message and a transaction amount stored in the associated clearing record; calculating, by the processing device of the processing server, a variance gratuity index for a merchant associated with the specific merchant identifier based on a variance in the tip amount identified for each transaction message in the identified subset; and electronically transmitting, by a transmitting device of the processing server, a data signal comprising at least the calculated average gratuity index in response to the received data request.

A system for communicating an index of service performance based on gratuity value includes a transaction database, a receiving device, a processing device, and a transmitting device of a processing server. The transaction database of the processing server is configured to store a plurality of transaction messages, wherein each transaction message is formatted pursuant to one or more standards and includes a plurality of data elements, including at least a first data element configured to store a merchant identifier associated with a merchant involved in the related payment transaction and a second data element configured to store a transaction amount, and addendum data. The receiving device of the processing server is configured to receive an electrical signal comprising a data request including at least a specific merchant identifier. The processing device of the processing server is configured to: execute a query on the transaction database to identify a subset of transaction messages where the merchant identifier stored in the first data element corresponds to the specific merchant identifier included in the received data request, identify a tip amount for each transaction message in the identified subset, wherein identifying the tip amount includes one of (i) extracting, from the addendum data included in the respective transaction message, the tip amount, or (ii) executing a query on a clearing database of the processing server to identify a clearing record associated with the respective transaction message, and calculating the tip amount based on the transaction amount stored in the second data element included in the respective transaction message and a transaction amount stored in the associated clearing record; and calculate an average gratuity index for a merchant associated with the specific merchant identifier as an average of the tip amount identified for each transaction message in the identified subset. The transmitting device of the processing server is configured to electronically transmit a data signal comprising at least the calculated average gratuity index in response to the received data request.

Another system for communicating an index of service performance based on gratuity value includes a transaction database, a receiving device, a processing device, and a transmitting device of a processing server. The transaction database of the processing server is configured to store a plurality of transaction messages, wherein each transaction message is formatted pursuant to one or more standards and includes a plurality of data elements, including at least a first data element configured to store a merchant identifier associated with a merchant involved in the related payment transaction and a second data element configured to store a transaction amount, and addendum data. The receiving device of the processing server is configured to receive an electrical signal comprising a data request including at least a specific merchant identifier. The processing device of the processing server is configured to: execute a query on the transaction database to identify a subset of transaction messages where the merchant identifier stored in the first data element corresponds to the specific merchant identifier included in the received data request; identify a tip amount for each transaction message in the identified subset, wherein identifying the tip amount includes one of (i) extracting, from the addendum data included in the respective transaction message, the tip amount, or (ii) executing a query on a clearing database of the processing server to identify a clearing record associated with the respective transaction message, and calculating the tip amount based on the transaction amount stored in the second data element included in the respective transaction message and a transaction amount stored in the associated clearing record; and calculate a variance gratuity index for a merchant associated with the specific merchant identifier as a variance of the tip amount identified for each transaction message in the identified subset. The transmitting device of the processing server is configured to electronically transmit a data signal comprising at least the calculated average gratuity index in response to the received data request.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
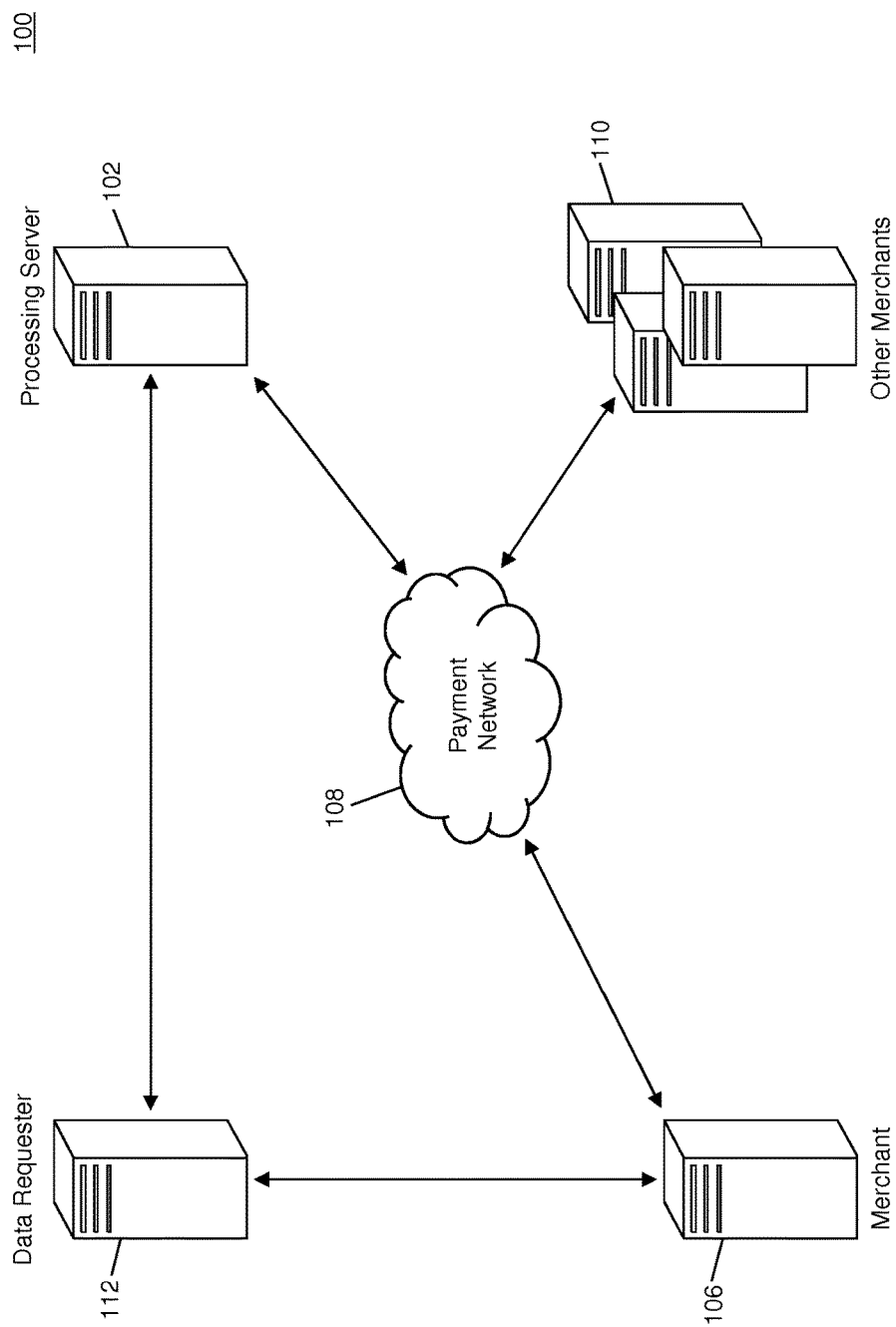
FIG. 1 is a block diagram illustrating a high level system architecture for the calculation of indices of service performance for merchants using gratuity values in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require and special knowledge in offered products. In some embodiments, an entity involved in a single transaction may be considered a merchant.

Acquirer—An entity that may process payment card transactions on behalf of a merchant. The acquirer may be a bank or other financial institution authorized to process payment card transactions on a merchant's behalf. In many instances, the acquirer may open a line of credit with the merchant acting as a beneficiary. The acquirer may exchange funds with an issuer in instances where a consumer, which may be a beneficiary to a line of credit offered by the issuer, transacts via a payment card with a merchant that is represented by the acquirer.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

System for Calculating Indices Based on Gratuity Values

FIG. 1 illustrates a system 100 for the calculation of indices representative of merchant service performance based on gratuity values for electronic payment transactions involving the merchant.

The system 100 may include a processing server 102. The processing server 102 may be configured to calculate indices of service performance for a merchant 106 based on gratuity values identified from transaction data for payment transactions involving the merchant 106. During the usual course of business, the merchant 106 may (e.g., via a point of sale device and/or additional computing devices and systems) initiate payment transactions for transactions involving consumers of the merchant 106. The processing of the payment transactions may include the submission of transaction details to a payment network 108 for processing using payment rails. Transaction details may be submitted to the payment network 108 directly by the merchant 106 or via one or more intermediate entities, such as gateway processors, acquiring financial institutions, etc., using the payment rails, which consists of specialized infrastructure associated with payment networks used thereby in the transmission of transaction data for payment transaction. Additional detail regarding the communication of transaction data to and from a payment network 108 using the payment rails is discussed in more detail below with respect to the process 700 illustrated in FIG. 7.

The payment network 108 may receive a transaction message (e.g., from the point of sale device or system of the merchant 106 or another entity associated with the merchant 106, such as an acquiring bank) for each payment transaction to be processed. The transaction message may be a specially formatted data message that is formatted based on one or more standards governing the electronic transmission of transaction messages, such as the International Organization of Standardization's ISO 8583 standard. Each transaction message may include a plurality of data elements, each data element being configured to store data as set forth in the associated standard(s). For instance, each transaction message may include a data element configured to store a transaction amount, a data element configured to store an identifier associated with the merchant 106 involved in the transaction, and additional data elements, such as configured to store a transaction time, transaction date, geographic location, account number of the transaction account used to fund the transaction, offer data, loyalty data, reward data, etc. In some instances, a transaction message may also include addendum data, which may store additional data not included in data elements, including data that may not be specified for inclusion in a data element under the associated standard(s). In some embodiments, transaction messages may also include additional data as set forth in the associated standard(s), such as a message type indicator indicative of a type for the transaction message and one or more bitmaps indicating the data elements included therein and data stored therein.

The payment network 108 may receive transaction messages and may process payment transactions based thereon using traditional methods and systems, such as discussed in more detail below with respect to the process 700 illustrated in FIG. 7. The processing of a payment transaction may include the forwarding of the transaction message to an issuing financial institution associated with a transaction account used to fund the payment transaction, the receipt of a response from the issuing financial institution indicating approval or denial of the transaction, and the forwarding of the response to the merchant 106 (e.g., via one or more intermediate entities, such as an acquiring financial institution).

In many instances, the transaction message may be an authorization request, for which the issuing financial institution authorizes the transaction indicating the ability for the transaction account to fund the transaction. In such instances, a second transaction message may be later transmitted to the payment network 108, which may be a clearing request. The clearing request may indicate, when forwarded to the issuing financial institution, that payment is requested by the merchant 106 (e.g., or entity associated with the merchant, such as the acquiring financial institution).

The payment network 108 may electronically transmit transaction messages for payment transactions involving the merchant 106, including authorization requests and clearing records, to the processing server 102 for use in calculating indices of service performance for the merchant 106. Transaction messages involving the merchant 106 may be identified based on the merchant identifier stored in the corresponding data element as being associated with the merchant 106. The transaction messages may be electronically transmitted to the processing server 102 by the payment network 108 using the payment rails, or via an alternative communication network, such as the Internet, a local area network, a wireless area network, a radio frequency network, etc. In some embodiments, the processing server 102 may be a part of the payment network 108. In such embodiments, the processing server 102 may receive the transaction messages via internal communications, or may be configured to access transaction messages as stored in the payment network 108 internal to the processing server 102 or external to the processing server 102.

The processing server 102 may be configured to identify gratuity values (e.g., tip amounts) for each payment transaction involving the merchant 106. In some instances, the gratuity value may be stored in the addendum data that is included in a transaction message. In other instances, the processing server 102 may identify the gratuity value for a payment transaction based on the transaction amount stored in the corresponding data element in the authorization request for the payment transaction as compared to the transaction amount stored in the corresponding data element in the clearing record for the payment transaction. In such instances, an authorization request submitted from a merchant 106 to the payment network 108 may include the transaction amount for the payment transaction prior to a tip amount being added, such as a result from a consumer's payment card being run for authorization prior to the consumer indicating the tip amount that they wish to leave. When the clearing record is submitted, the merchant 106 may have added the tip amount indicated by the consumer to the transaction amount, such that the clearing record has a transaction amount higher than the authorization request. The processing server 102 may thus identify the transaction amount included in each transaction message to determine the tip amount based on the difference.

The processing server 102 may also be configured to calculate indices of service performance based on the identified gratuity values in each transaction message. Indices of service performance may include, for example, an average gratuity index and a variance gratuity index. The average gratuity index may represent the average gratuity value for each payment transaction involving the merchant 106. The variance gratuity index may represent the variance in the gratuity value for each transaction, such as based on the difference in highest and lowest gratuity value, average variance from the median or average gratuity value, the standard deviation of the gratuity value, or other suitable method for identifying variance in a set of values that will be apparent to persons having skill in the relevant art.

In some embodiments, the processing server 102 may be further configured to benchmark the merchant's service performance as compared to other merchants 110. In such embodiments, the processing server 102 may calculate indices for the merchant 106 based on the transaction messages for payment transactions involving the merchant 106, and may repeat the process for one or more other merchants 110. The processing server 102 may then identify a benchmark value for the merchant 106 based on the index values calculated for the merchant 106 and the index values calculated for the other merchants 110. In some instances, the processing server 102 may benchmark the merchant 106 against other merchants 110 located in the same or a similar geographic area. For example, the mean of the average gratuity index for merchants 110 in a geographic area may be 0.23 (e.g., representing an average gratuity of 23 cents per dollar of the ticket amount), while the merchant 106 may have a benchmark value of 135, where a benchmark value of 100 represents an average gratuity index that matches the mean for the area and where the merchant's benchmark value of 135 represents a 35% higher average gratuity index than the mean.

In some cases, the processing server 102 may calculate indices of service performance based on the time at which the transaction occurs. For example, if the merchant 106 is a restaurant, the processing server 102 may calculate indices for the merchant 106 for lunch transactions, dinner transactions, weekend transactions, happy hour transactions, etc., such as based on time and date data stored in corresponding data elements in each transaction message. In such cases, the processing server 102 may also benchmark the performance of the merchant 106 during those times as against other merchants 110 based on index values calculated for the other merchants 110 using the same times. Such data may thus be used in determining the level of service for the merchant 106 at lunch time, dinner time, during happy hour, on a weekend, etc.

In some embodiments, the system 100 may include a data requester 112. The data requester 112 may be, for example, a consumer, an advertising agency, a review website operator, the merchant 106, or other entity that may be interested in the service performance of the merchant 106. The data requester 112 may electronically transmit a data signal to the processing server 102 that is superimposed with a request for service performance of the merchant 106. The request may include at least the merchant identifier associated with the merchant 106, and may also indicate one or more indices of service performance or benchmark values requested. The processing server 102 may parse the data signal to obtain the request and data contained therein, may identify the transaction messages for payment transactions involving the indicated merchant 106 using the merchant identifier, and may calculate the requested indices based on the gratuity values for the identified transactions, and, if requested, benchmark values based thereon. The processing server 102 may superimpose the calculated indices and/or benchmark values on a data signal, which may be electronically transmitted back to the data requester 112 using a suitable communication network.

The methods and systems discussed herein enable the processing server 102 to calculate indices of service performance for a merchant 106 based on gratuity values identified from transaction messages for payment transactions involving the merchant 106. By using transaction messages to identify gratuity values, the processing server 102 may calculate indices that provide for a more complete and accurate estimation of service performance of a merchant 106, as it may thus consider every transaction processed by the payment network 108 and not rely on self-reporting of the merchant 106 or consumers, which may be subject to a number of different biases. In addition, the specialized programming and configuration of the processing server 102 may enable the calculation of indices of service performance without significant technical modification to merchant point of sale systems, and may, through the specialized configuration, capture the gratuity values from transaction messages formatted using traditionally-used standards.

Processing Server

Figure 2:
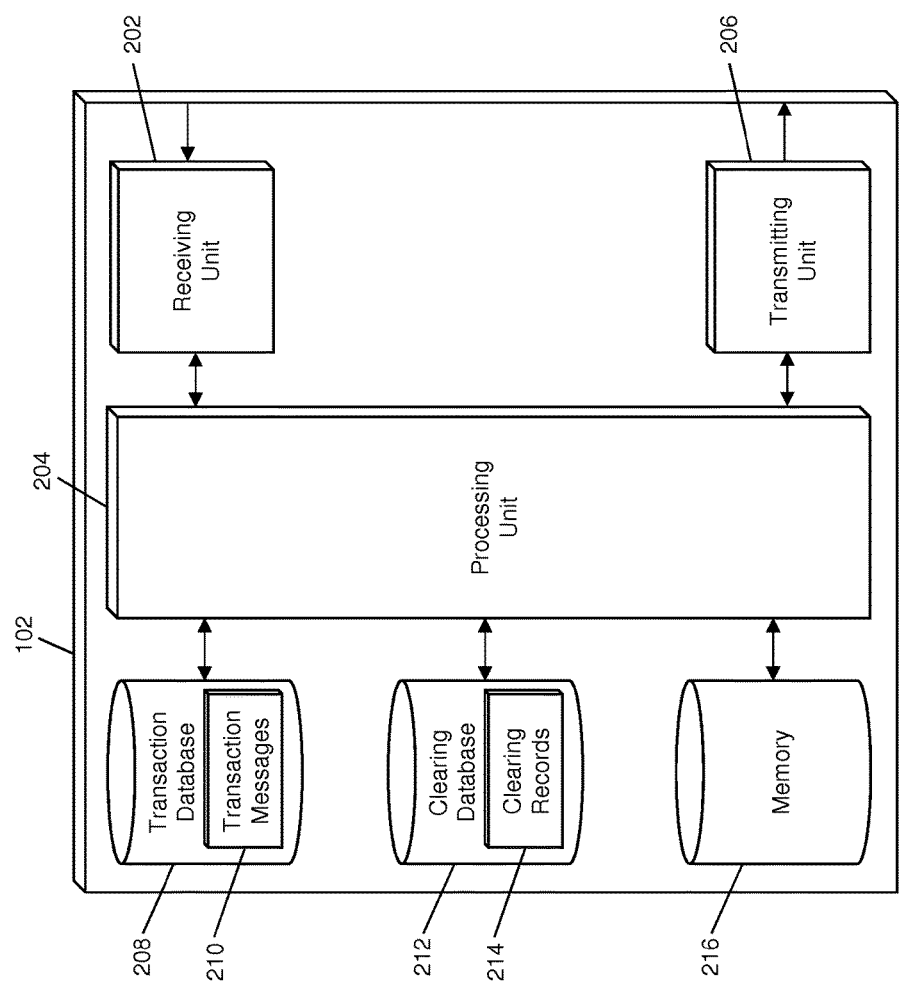
FIG. 2 is a block diagram illustrating the processing server of FIG. 1 for calculating indices of service performance using gratuity values in accordance with exemplary embodiments.

FIG. 2 illustrates an embodiment of the processing server 102 of the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 800 illustrated in FIG. 8 and discussed in more detail below may be a suitable configuration of the processing server 102.

The processing server 102 may include a receiving unit 202. The receiving unit 202 may be configured to receive data over one or more networks via one or more network protocols. In some embodiments, the receiving unit 202 may be configured to receive data over the payment rails, such as using specially configured infrastructure associated with payment networks 104 for the transmission of transaction messages that include sensitive financial data and information. In some instances, the receiving unit 202 may also be configured to receive data from data requesters 112, payment networks 108, and other entities via alternative networks, such as the Internet. In some embodiments, the receiving unit 202 may be comprised of multiple units, such as different receiving units for receiving data over different networks, such as a first receiving unit for receiving data over payment rails and a second receiving unit for receiving data over the Internet. The receiving unit 202 may receive electronically data signals that are transmitted, where data may be superimposed on the data signal and decoded, parsed, read, or otherwise obtained via receipt of the data signal by the receiving unit 202. In some instances, the receiving unit 202 may include a parsing module for parsing the received data signal to obtain the data superimposed thereon.

The receiving unit 202 may be configured to receive data signals electronically transmitted by the data requester 112 and the payment network 108. Data signals electronically transmitted by the data requester 112 may be superimposed with indices and benchmark requests, which may include a merchant identifier associated with a merchant 106 for whom the indicated indices and/or benchmark values are requested. Data signals electronically transmitted by the payment network 108 and received by the receiving unit 202 may be superimposed with, or may otherwise comprise, transaction messages for payment transactions.

The processing server 102 may also include a processing unit 204. The processing unit 204 may be configured to perform the functions of the processing server 102 discussed herein as will be apparent to persons having skill in the relevant art. In some embodiments, the processing unit 204 may include and/or be comprised of a plurality of engines and/or modules specially configured to perform one or more functions of the processing unit 204. For example, the processing unit 204 may include a querying module configured to query databases included in the processing server 102 to identify information stored therein. In some instances, the processing unit 204 may include a parsing module or engine configured to parse data from data signals electronically received by the receiving unit 202, an encryption module or engine configured to decrypt received data or data signals or to encrypt data or data signals received or transmitted by the processing server 102, and any other modules suitable for performing the functions discussed herein. As used herein, the term "module" may denote software and/or hardware configured to receive a specified input, perform a process thereon, and execute an output based upon the process performed by the module.

The processing server 102 may further include a transaction database 208. The transaction database 208 may be configured to store a plurality of transaction messages 210 using a suitable data storage format and schema. Each transaction message 210 may be formatted based on one or more standards, such as the ISO 8583 standard, and may be a standardized data set that includes a plurality of data elements and additional data, such as an addendum, that is configured to store data as set forth in the associated standards. For example, each transaction message 210 may include a data element configured to store a merchant identifier associated with the merchant 106 involved in the related payment transaction, a data element configured to store a transaction amount, a data element configured to store a transaction identifier, and additional data elements configured to store additional transaction data. Merchant identifiers may be unique values associated with a merchant 106 for use in identifying the merchant 106 involved in the related payment transactions. Transaction identifiers may be unique values associated with a specific payment transaction for use in identifying the transaction messages 210 associated thereto. In instances where a transaction message 210 includes addendum data, the addendum data may be configured to store a gratuity value for the related payment transaction.

Transaction messages 210 may also include a message type indicator. The message type indicator may be indicative of the type of transaction message, such as authorization request, authorization response, repeat authorization, authorization advice, etc. In some instances, the transaction database 208 may not include any transaction messages having a message type indicator indicative of a clearing record. In such instances, the processing server 102 may store clearing records as clearing records 214 in a clearing database 212. The clearing database 212 may be configured to store a plurality of clearing records 214 using any suitable data storage format and schema. Each clearing record 214 may be a transaction message, similarly formatted to the transaction messages 210 in the transaction database 208, but with a message type indicator indicative of being a clearing record.

The processing unit 204 may include a querying module. The querying module may be configured to receive query strings or other suitable types of data as input, and may execute corresponding queries on databases of the processing server 102 to identify data. For instance, the querying module may execute a query on the transaction database 208 to identify transaction messages 210 for payment transactions involving a specific merchant 106, with each transaction message 210 identifying having a merchant identifier associated with the specific merchant 106. The querying module may also execute a query on the clearing database 212 to identifying clearing records 214 also having a merchant identifier associated with the specific merchant 106. The querying module may output the identified transaction messages 210 and clearing records 214 and data stored therein.

The processing unit 204 may further include a tip identification module. The tip identification module may be configured to identify a tip amount (e.g., gratuity value) for each transaction message 210. The tip identification module may receive a transaction message 210 as input, may identify the tip amount for the transaction message 210, and output the identified tip amount. The tip identification module may be configured to identify a tip amount for a transaction message 210 by identifying the tip amount as included in addendum data included in the transaction message 210. The tip identification module may also be configured to identify a tip amount by matching a transaction message 210 to a clearing record 214, and identify the tip amount as based on a difference in transaction amounts stored in the corresponding data element in the matched transaction message 210 and clearing record 214. Transaction messages 210 and clearing records 214 may be matched based on transaction identifiers stored therein and/or correspondence between data values stored in a plurality of data elements, such as the transaction message 210 and clearing record 214 including a common primary account number, transaction time, and transaction date.

The processing unit 204 may also include an index calculation module. The index calculation module may be configured to calculate service performance indices for merchants 106 based on tip amounts for the respective merchant 106. The index calculation module may receive the tip amounts identified by the tip identification module as input, may calculate indices of service performance based thereon, and may output the calculated indices. The calculation of the indices may be based on the tip amounts for each payment transaction as well as the index being calculated. For instance, the average gratuity index may be the average (e.g., mean or median) or the tip amounts for each payment transaction, whereas, the variance gratuity index may be a variance in tip amount, which may be calculated using a variety of suitable methods for calculating variance in a set of values. In some instances, the index calculation module may calculate indices of service performance for specific dates and/or times. In such instances, the index calculation module may identify the date and/or time for each tip amount (e.g., based on the data stored in the corresponding data elements included in the associated transaction message 210), or the index calculation module may receive tip amounts grouped by date and/or time from the tip identification module, which may have identified the tip amounts from transaction messages 210 and clearing records 214 grouped by date and time as identified via the querying module.

The processing unit 204 may also include a benchmarking module. The benchmarking module may be configured to identify a benchmark value for a merchant 106 based on the calculated indices of service performance for the merchant 106 and indices of service performance calculated for other merchants 110. The benchmarking module may receive one or more indices of service performance for a merchant 106, may compare the respective indices to the same indices for the other merchants 110, and output a benchmark value based on the comparison.

The processing server 102 may further include a transmitting unit 206. The transmitting unit 206 may be configured to transmit data over one or more networks via one or more network protocols. In some embodiments, the transmitting unit 206 may be configured to transmit data over the payment rails, such as using specially configured infrastructure associated with payment networks 108 for the transmission of transaction messages that include sensitive financial data and information, such as identified payment credentials. In some instances, the transmitting unit 206 may be configured to transmit data to data requesters 112, the merchant 106, other merchants 110, the payment network 108, and other entities via alternative networks, such as the Internet. In some embodiments, the transmitting unit 206 may be comprised of multiple units, such as different transmitting units for transmitting data over different networks, such as a first transmitting unit for transmitting data over the payment rails and a second transmitting unit for transmitting data over the Internet. The transmitting unit 206 may electronically transmit data signals that have data superimposed that may be parsed by a receiving computing device. In some instances, the transmitting unit 206 may include one or more modules for superimposing, encoding, or otherwise formatting data into data signals suitable for transmission.

The transmitting unit 206 may be configured to electronically transmit a data signal superimposed with calculated indices of service performance and/or identified benchmark values. The data signal may be electronically transmitted in response to a request received from an entity, such as the merchant 106, other merchants 110, the data requester 112, etc. In some instances, the data signal may be superimposed with multiple indices and/or benchmark values. In other instances, the transmitting unit 206 may electronically transmit a separate data signal for each index of service performance and/or benchmark value being transmitted.

The processing server 102 may also include a memory 216. The memory 216 may be configured to store data for use by the processing server 102 in performing the functions discussed herein. The memory 216 may be configured to store data using suitable data formatting methods and schema and may be any suitable type of memory, such as read-only memory, random access memory, etc. The memory 216 may include, for example, encryption keys and algorithms, communication protocols and standards, data formatting standards and protocols, program code for modules and application programs of the processing unit 204, and other data that may be suitable for use by the processing server 102 in the performance of the functions disclosed herein as will be apparent to persons having skill in the relevant art.

Process for Benchmarking of Merchant Performance Using Gratuity Values

Figure 3:
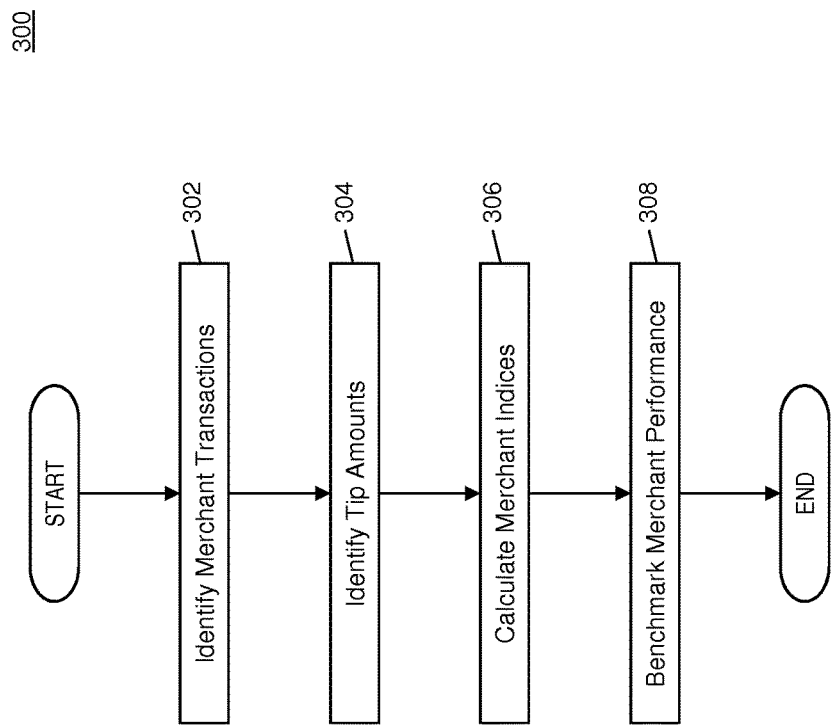
FIG. 3 is a flow diagram illustrating a process for benchmarking merchant performance based on gratuity values in accordance with exemplary embodiments.

FIG. 3 illustrates a process 300 for the benchmarking of merchant performance against other merchants 110 based on indices of service performance for the merchant 106 calculated using gratuity values identified from electronic payment transactions involving the merchant 106.

In step 302, the querying module of the processing unit 204 of the processing server 102 may execute a query on the transaction database 208 of the processing server 102 to identify transaction messages 210 for payment transactions involving the merchant 106. Transaction messages 210 for payment transactions involving the merchant 106 may be identified based on corresponding of the merchant identifier stored in the corresponding data element of the transaction message 210 to a merchant identifier associated with the merchant 106. In some instances, the querying module may also execute a query on the clearing database 212 to identify clearing records 214 for payment transactions involving the merchant 106. In some embodiments, the querying module may execute queries to identify transaction messages 210, and clearing records 214, if applicable, for a specific date and/or time or ranges thereof.

In step 304, the tip identification module of the processing unit 204 may identify tip amounts for each of the identified transaction messages 210. The tip amount may be identified by extracting the tip amount from addendum data included in the transaction message 210, or by calculating a difference in the transaction amount stored in the corresponding data element in a transaction message 210 and corresponding clearing record 214. The corresponding clearing record 214 may be identified via execution of a query on the clearing database 212 by the querying module of the processing unit 204 using a transaction identifier or other data value(s) stored in corresponding data elements in the transaction message 210 and corresponding clearing record 214. In some instances, the tip identification module may, for a transaction message 210, request the querying module to execute a query on the clearing database 212 to identify the corresponding clearing record 214 using the transaction identifier or other values, for use in identifying the tip amount for the payment transaction related to the transaction message 210.

In step 306, the index calculation module of the processing unit 204 may calculate indices of service performance for the merchant 106. The indices may be based on the tip amount identified for each of the identified transaction messages 210. The index calculation module may use one or more algorithms specially configured for the identification of the corresponding index of service performance, such as algorithms used to identify an average gratuity index for the merchant 106 and algorithms used to identify a variance gratuity index for the merchant 106.

In step 308, the benchmarking module of the processing unit 204 may benchmark the performance of the merchant 106 against other merchants 110. The benchmarking may be based on a comparison of the calculated indices of the merchant 106 as compared to the corresponding indices of service performance for other merchants 110. In some instances, the other merchants 110 may be located in a geographic area that includes the merchant 106. In other instances, the other merchants 110 may be located outside of the geographic area, but may be similar to the merchant 106 in one or more other criteria, such as industry, revenue, demographics of the respective geographic area, etc.

Process for Updating Performance Indices Using Gratuity Values

Figure 4:
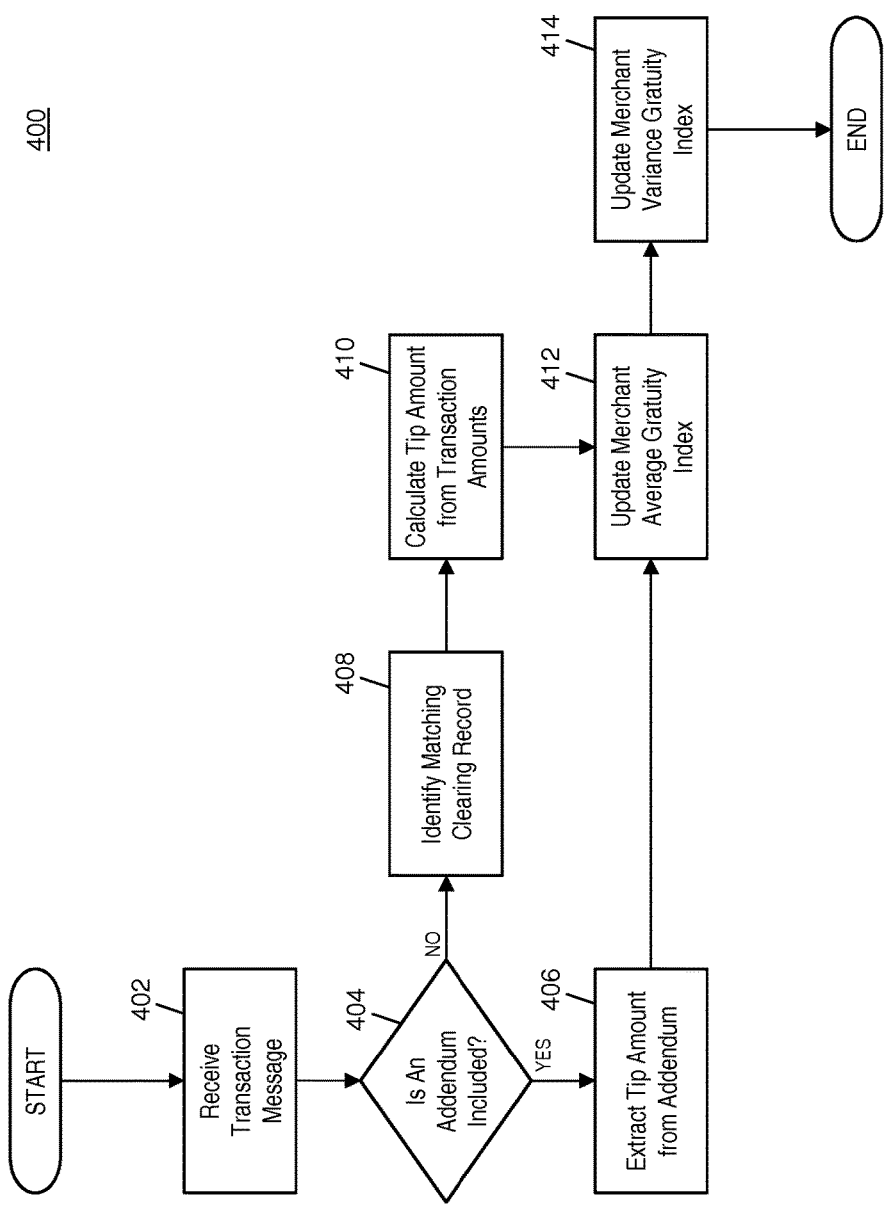
FIG. 4 is a flow diagram illustrating a process for updating indices of service performance for a merchant using gratuity values using the processing server of FIG. 2 in accordance with exemplary embodiments.

FIG. 4 illustrates a process 400 for the updating of indices of service performance for a merchant 106 based on a tip amount for a payment transaction involving the merchant 106.

In step 402, the receiving unit 202 of the processing server 102 may receive a transaction message electronically transmitted via the payment network 108. The transaction message may include at least a first data element configured to store a transaction amount, a second data element configured to store a merchant identifier associated with the merchant 106, and one or more additional elements configured to store additional transaction data. In step 404, the processing unit 204 of the processing server 102 may determine if the received transaction message includes an addendum that includes a tip amount. The determination may be based on the parsing of the received transaction message to obtain the data included therein and the inclusion of an addendum in the transaction message, as well as the inclusion of a tip amount in the addendum.

If the transaction message does include an addendum with a tip amount, then, in step 406, the tip identification module of the processing unit 204 may extract the tip amount from the addendum. If the transaction message does not include an addendum and/or the addendum does not include a tip amount, then, in step 408, the tip identification module may match a clearing record 214 to the received transaction message. The matching of the clearing record 214 may include the execution of a query via the querying module of the processing unit 204 on the clearing database 212 to identify a clearing record 214 that includes the same transaction identifier or one or more other data values that is included in the data elements of the received transaction message. In some instances, step 408 may wait until a clearing record 214 that matches the received transaction message has been received. In such instances, the tip identification module may evaluate received clearing records 214 to identify a clearing record 214 that matches the received transaction message, using the transaction identifier or one or more other data values included therein. Once the matching clearing record 214 has been identified, then, in step 410, the tip identification module may calculate the tip amount for the payment transaction based on a difference in the transaction amount included in the corresponding data element in the matched clearing record and in the received transaction message.

Once the tip amount has been extracted or calculated, as applicable, then, in step 412, the index calculation module of the processing unit 204 may calculate an updated merchant average gratuity index. The updated merchant average gratuity index may be an update of a previously calculated average gratuity index for the merchant 106, whereby the index is updated based on the newly identified tip amount. In step 414, the index calculation module may also calculate an updated variance gratuity index for the merchant 106 based on the newly identified tip amount.

Figure 5:
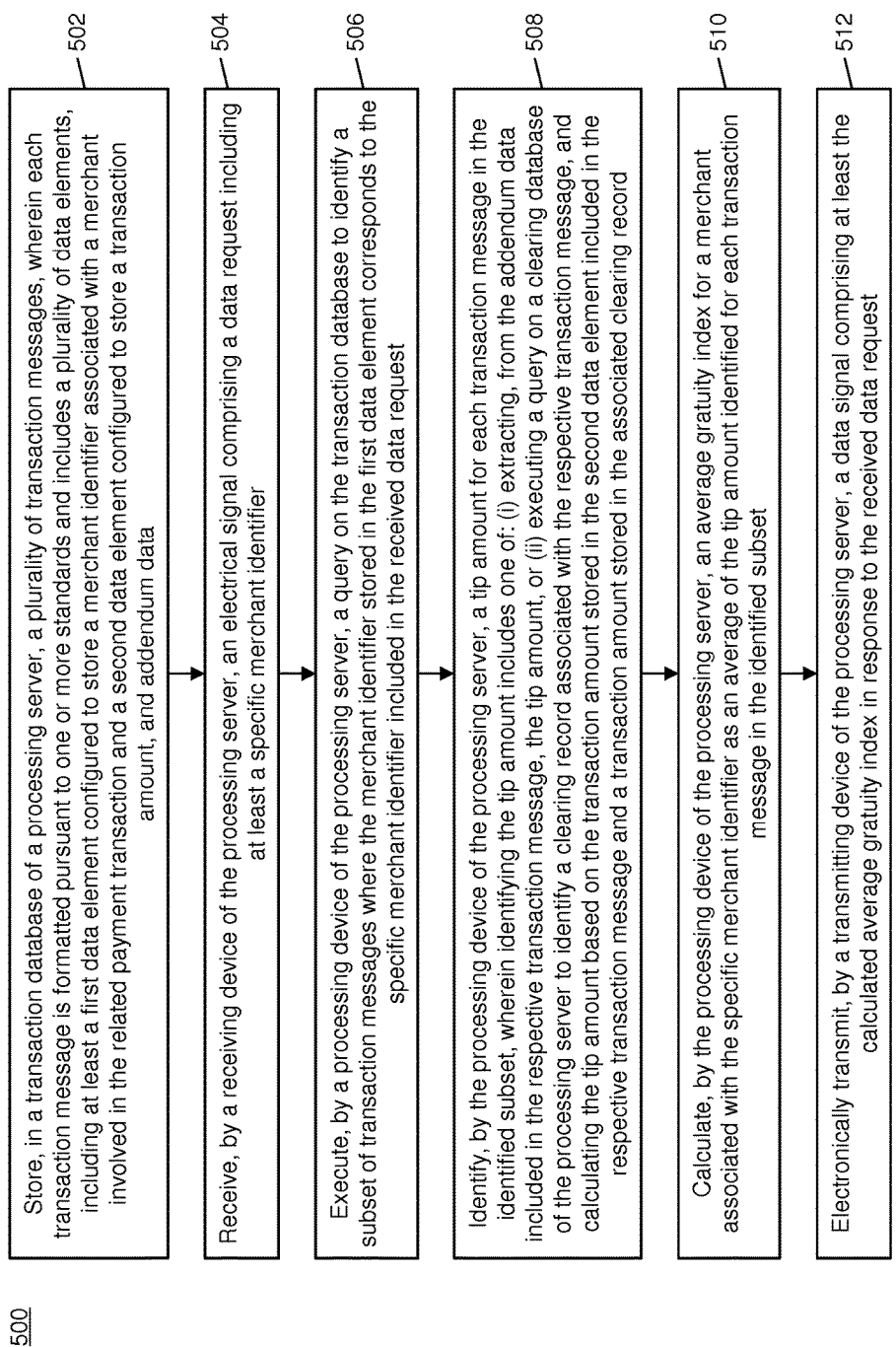
FIGS. 5 and 6 are flow charts illustrating exemplary methods for communicating an index of service performance based on gratuity value in accordance with exemplary embodiments.

First Exemplary Method for Communicating an Index of Service Performance Based on Gratuity Value FIG. 5 illustrates a method for communicating an average gratuity index as a measure of merchant performance based on gratuity values in electronic payment transactions involving a merchant.

In step 502, a plurality of transaction messages (e.g., transaction messages 210) may be stored in a transaction database (e.g., the transaction database 208) of a processing server (e.g., the processing server 102), wherein each transaction message is formatted pursuant to one or more standards and includes a plurality of data elements, including at least a first data element configured to store a merchant identifier associated with a merchant (e.g., the merchant 106) involved in the related payment transaction and a second data element configured to store a transaction amount, and addendum data. In step 504, an electrical signal comprising a data request that includes a specific merchant identifier may be received by a receiving device (e.g., the receiving unit 202) of the processing server.

In step 506, a query may be executed by a processing device (e.g., the processing unit 204) of the processing server on the transaction database to identify a subset of transaction messages where the merchant identifier stored in the first data element corresponds to the specific merchant identifier included in the received data request. In step 508, the processing device of the processing server may identify a tip amount for each transaction message in the identified subset, wherein identifying the tip amount includes one of: (i) extracting, from the addendum data included in the respective transaction message, the tip amount, or (ii) executing a query on a clearing database (e.g., the clearing database 212) of the processing server to identify a clearing record (e.g., clearing record 214) associated with the respective transaction message, and calculating the tip amount based on the transaction amount stored in the second data element included in the respective transaction message and a transaction amount stored in the associated clearing record.

In step 510, an average gratuity index for a merchant associated with the specific merchant identifier may be calculated by the processing device of the processing server as an average of the tip amount identified for each transaction message in the identified subset. In step 512, a data signal comprising at least the calculated average gratuity index may be electronically transmitted by a transmitting device (e.g., the transmitting unit 206) of the processing server in response to the received data request.

In one embodiment, the method 500 may further include: repeating the executing, identifying, and calculating steps for each of a plurality of additional merchant identifiers; and identifying, by the processing device of the processing server, a benchmark value based on the calculated average gratuity index for the merchant as compared to the average gratuity index calculated for each of the plurality of additional merchant identifiers, wherein the data signal further comprises the identified benchmark value. In a further embodiment, each of the plurality of additional merchant identifiers may be associated with a merchant included in a geographic area including the merchant associated with the specific merchant identifier.

In some embodiments, each transaction message may be associated with a transaction identifier included in the transaction database, each clearing record in the clearing database may be associated with a transaction identifier included in the clearing database, and identification of a clearing record associated with the respective transaction message may be based on correspondence between the transaction identifier associated with the clearing record and the transaction identifier associated with the respective transaction message In one embodiment, each transaction message may further include a third data element configured to store a transaction date; the data request may further include a range of dates; and the transaction date stored in the third data element included in each transaction message in the identified subset may be within the range of dates.

Figure 6:
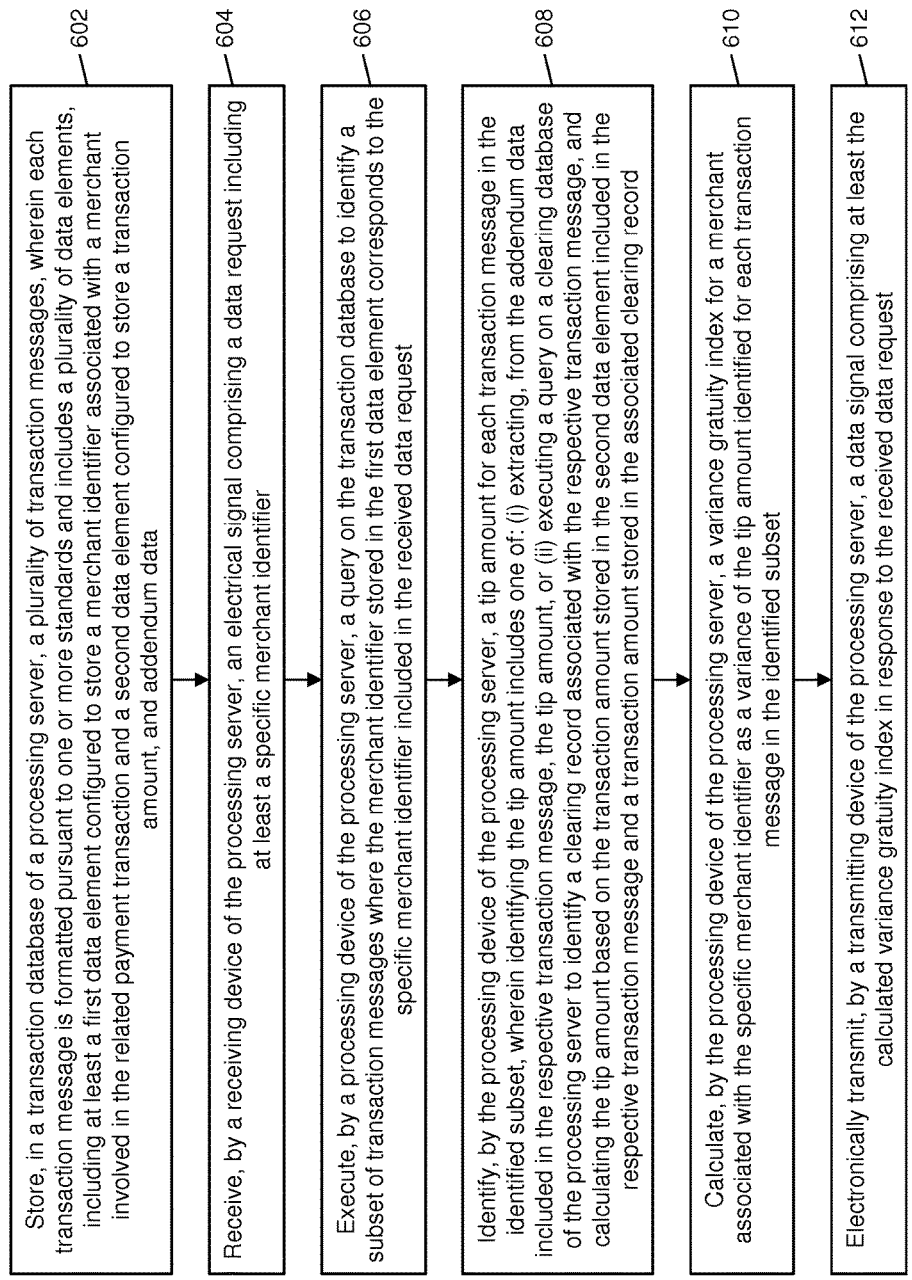

Second Exemplary Method for Communicating an Index of Service Performance Based on Gratuity Value FIG. 6 illustrates a method for communicating a variance gratuity index as a measure of merchant performance based on gratuity values in electronic payment transactions involving a merchant.

In step 602, a plurality of transaction messages (e.g., transaction messages 210) may be stored in a transaction database (e.g., the transaction database 208) of a processing server (e.g., the processing server 102), wherein each transaction message is formatted pursuant to one or more standards and includes a plurality of data elements, including at least a first data element configured to store a merchant identifier associated with a merchant (e.g., the merchant 106) involved in the related payment transaction and a second data element configured to store a transaction amount, and addendum data. In step 604, an electrical signal comprising a data request that includes a specific merchant identifier may be received by a receiving device (e.g., the receiving unit 202) of the processing server.

In step 606, a query may be executed by a processing device (e.g., the processing unit 204) of the processing server on the transaction database to identify a subset of transaction messages where the merchant identifier stored in the first data element corresponds to the specific merchant identifier included in the received data request. In step 608, the processing device of the processing server may identify a tip amount for each transaction message in the identified subset, wherein identifying the tip amount includes one of: (i) extracting, from the addendum data included in the respective transaction message, the tip amount, or (ii) executing a query on a clearing database (e.g., the clearing database 212) of the processing server to identify a clearing record (e.g., clearing record 214) associated with the respective transaction message, and calculating the tip amount based on the transaction amount stored in the second data element included in the respective transaction message and a transaction amount stored in the associated clearing record.

In step 610, a variance gratuity index for a merchant associated with the specific merchant identifier may be calculated by the processing device of the processing server based on a variance in the tip amount identified for each transaction message in the identified subset. In step 612, a data signal comprising at least the calculated variance gratuity index may be electronically transmitted by a transmitting device (e.g., the transmitting unit 206) of the processing server in response to the received data request.

In one embodiment, the method 600 may further include: repeating the executing, identifying, and calculating steps for each of a plurality of additional merchant identifiers; and identifying, by the processing device of the processing server, a benchmark value based on the calculated variance gratuity index for the merchant as compared to the variance gratuity index calculated for each of the plurality of additional merchant identifiers, wherein the data signal further comprises the identified benchmark value. In a further embodiment, each of the plurality of additional merchant identifiers may be associated with a merchant included in a geographic area including the merchant associated with the specific merchant identifier.

In some embodiments, each transaction message may be associated with a transaction identifier included in the transaction database, each clearing record in the clearing database may be associated with a transaction identifier included in the clearing database, and identification of a clearing record associated with the respective transaction message may be based on correspondence between the transaction identifier associated with the clearing record and the transaction identifier associated with the respective transaction message In one embodiment, each transaction message may further include a third data element configured to store a transaction date; the data request may further include a range of dates; and the transaction date stored in the third data element included in each transaction message in the identified subset may be within the range of dates.

Payment Transaction Processing System and Process

Figure 7:
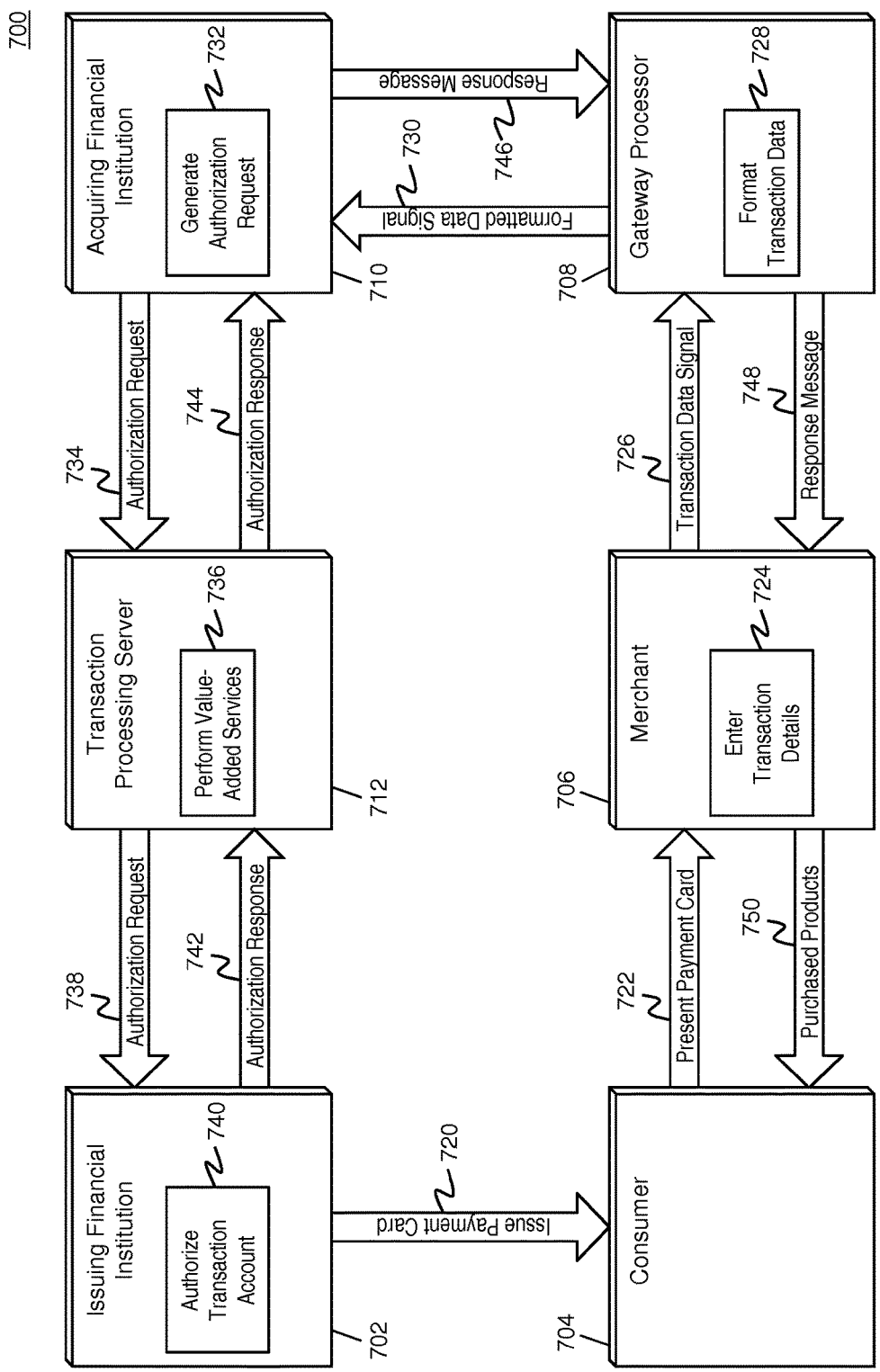
FIG. 7 is a flow diagram illustrating the processing of a payment transaction in accordance with exemplary embodiments.

FIG. 7 illustrates a transaction processing system and a process 700 for the processing of payment transactions in the system. The process 700 and steps included therein may be performed by one or more components of the system 100 discussed above, such as the merchant 106, processing server 102, and payment network 108. The processing of payment transactions using the system and process 700 illustrated in FIG. 7 and discussed below may utilize the payment rails, which may be comprised of the computing devices and infrastructure utilized to perform the steps of the process 700 as specially configured and programmed by the entities discussed below, including the transaction processing server 712, which may be associated with one or more payment networks configured to processing payment transactions. It will be apparent to persons having skill in the relevant art that the process 700 may be incorporated into the processes illustrated in FIGS. 3-6, discussed above, with respect to the step or steps involved in the processing of a payment transaction. In addition, the entities discussed herein for performing the process 700 may include one or more computing devices or systems configured to perform the functions discussed below. For instance, the merchant 704 may be comprised of one or more point of sale devices, a local communication network, a computing server, and other devices configured to perform the functions discussed below.

In step 720, an issuing financial institution 702 may issue a payment card or other suitable payment instrument to a consumer 704. The issuing financial institution may be a financial institution, such as a bank, or other suitable type of entity that administers and manages payment accounts and/or payment instruments for use with payment accounts that can be used to fund payment transactions. The consumer 704 may have a transaction account with the issuing financial institution 702 for which the issued payment card is associated, such that, when used in a payment transaction, the payment transaction is funded by the associated transaction account. In some embodiments, the payment card may be issued to the consumer 704 physically. In other embodiments, the payment card may be a virtual payment card or otherwise provisioned to the consumer 704 in an electronic format.

In step 722, the consumer 704 may present the issued payment card to a merchant 706 for use in funding a payment transaction. The merchant 706 may be a business, another consumer, or any entity that may engage in a payment transaction with the consumer 704. The payment card may be presented by the consumer 704 via providing the physical card to the merchant 706, electronically transmitting (e.g., via near field communication, wireless transmission, or other suitable electronic transmission type and protocol) payment details for the payment card, or initiating transmission of payment details to the merchant 706 via a third party. The merchant 706 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 724, the merchant 706 may enter transaction details into a point of sale computing system. The transaction details may include the payment details provided by the consumer 704 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 706 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 706 may be an online retailer in an e-commerce transaction. In such embodiments, the transaction details may be entered in a shopping cart or other repository for storing transaction data in an electronic transaction as will be apparent to persons having skill in the relevant art.

In step 726, the merchant 706 may electronically transmit a data signal superimposed with transaction data to a gateway processor 708. The gateway processor 708 may be an entity configured to receive transaction details from a merchant 706 for formatting and transmission to an acquiring financial institution 710. In some instances, a gateway processor 708 may be associated with a plurality of merchants 706 and a plurality of acquiring financial institutions 710. In such instances, the gateway processor 708 may receive transaction details for a plurality of different transactions involving various merchants, which may be forwarded on to appropriate acquiring financial institutions 710. By having relationships with multiple acquiring financial institutions 710 and having the requisite infrastructure to communicate with financial institutions using the payment rails, such as using application programming interfaces associated with the gateway processor 508 or financial institutions used for the submission, receipt, and retrieval of data, a gateway processor 708 may act as an intermediary for a merchant 706 to be able to conduct payment transactions via a single communication channel and format with the gateway processor 708, without having to maintain relationships with multiple acquiring financial institutions 710 and payment processors and the hardware associated thereto. Acquiring financial institutions 710 may be financial institutions, such as banks, or other entities that administers and manages payment accounts and/or payment instruments for use with payment accounts. In some instances, acquiring financial institutions 710 may manage transaction accounts for merchants 706. In some cases, a single financial institution may operate as both an issuing financial institution 702 and an acquiring financial institution 710.

The data signal transmitted from the merchant 706 to the gateway processor 708 may be superimposed with the transaction details for the payment transaction, which may be formatted based on one or more standards. In some embodiments, the standards may be set forth by the gateway processor 708, which may use a unique, proprietary format for the transmission of transaction data to/from the gateway processor 708. In other embodiments, a public standard may be used, such as the International Organization for Standardization's ISO 8783 standard. The standard may indicate the types of data that may be included, the formatting of the data, how the data is to be stored and transmitted, and other criteria for the transmission of the transaction data to the gateway processor 708.

In step 728, the gateway processor 708 may parse the transaction data signal to obtain the transaction data superimposed thereon and may format the transaction data as necessary. The formatting of the transaction data may be performed by the gateway processor 708 based on the proprietary standards of the gateway processor 708 or an acquiring financial institution 710 associated with the payment transaction. The proprietary standards may specify the type of data included in the transaction data and the format for storage and transmission of the data. The acquiring financial institution 710 may be identified by the gateway processor 708 using the transaction data, such as by parsing the transaction data (e.g., deconstructing into data elements) to obtain an account identifier included therein associated with the acquiring financial institution 710. In some instances, the gateway processor 708 may then format the transaction data based on the identified acquiring financial institution 710, such as to comply with standards of formatting specified by the acquiring financial institution 710. In some embodiments, the identified acquiring financial institution 710 may be associated with the merchant 706 involved in the payment transaction, and, in some cases, may manage a transaction account associated with the merchant 706.

In step 730, the gateway processor 708 may electronically transmit a data signal superimposed with the formatted transaction data to the identified acquiring financial institution 710. The acquiring financial institution 710 may receive the data signal and parse the signal to obtain the formatted transaction data superimposed thereon. In step 732, the acquiring financial institution may generate an authorization request for the payment transaction based on the formatted transaction data. The authorization request may be a specially formatted transaction message that is formatted pursuant to one or more standards, such as the ISO 8783 standard and standards set forth by a payment processor used to process the payment transaction, such as a payment network. The authorization request may be a transaction message that includes a message type indicator indicative of an authorization request, which may indicate that the merchant 706 involved in the payment transaction is requesting payment or a promise of payment from the issuing financial institution 702 for the transaction. The authorization request may include a plurality of data elements, each data element being configured to store data as set forth in the associated standards, such as for storing an account number, application cryptogram, transaction amount, issuing financial institution 702 information, etc.

In step 734, the acquiring financial institution 710 may electronically transmit the authorization request to a transaction processing server 712 for processing. The transaction processing server 712 may be comprised of one or more computing devices as part of a payment network configured to process payment transactions. In some embodiments, the authorization request may be transmitted by a transaction processor at the acquiring financial institution 710 or other entity associated with the acquiring financial institution. The transaction processor may be one or more computing devices that include a plurality of communication channels for communication with the transaction processing server 712 for the transmission of transaction messages and other data to and from the transaction processing server 712. In some embodiments, the payment network associated with the transaction processing server 712 may own or operate each transaction processor such that the payment network may maintain control over the communication of transaction messages to and from the transaction processing server 712 for network and informational security.

In step 736, the transaction processing server 712 may perform value-added services for the payment transaction. Value-added services may be services specified by the issuing financial institution 702 that may provide additional value to the issuing financial institution 702 or the consumer 704 in the processing of payment transactions. Value-added services may include, for example, fraud scoring, transaction or account controls, account number mapping, offer redemption, loyalty processing, etc. For instance, when the transaction processing server 712 receives the transaction, a fraud score for the transaction may be calculated based on the data included therein and one or more fraud scoring algorithms and/or engines. In some instances, the transaction processing server 712 may first identify the issuing financial institution 702 associated with the transaction, and then identify any services indicated by the issuing financial institution 702 to be performed. The issuing financial institution 702 may be identified, for example, by data included in a specific data element included in the authorization request, such as an issuer identification number. In another example, the issuing financial institution 702 may be identified by the primary account number stored in the authorization request, such as by using a portion of the primary account number (e.g., a bank identification number) for identification.

In step 738, the transaction processing server 712 may electronically transmit the authorization request to the issuing financial institution 702. In some instances, the authorization request may be modified, or additional data included in or transmitted accompanying the authorization request as a result of the performance of value-added services by the transaction processing server 712. In some embodiments, the authorization request may be transmitted to a transaction processor (e.g., owned or operated by the transaction processing server 712) situated at the issuing financial institution 702 or an entity associated thereof, which may forward the authorization request to the issuing financial institution 702.

In step 740, the issuing financial institution 702 may authorize the transaction account for payment of the payment transaction. The authorization may be based on an available credit amount for the transaction account and the transaction amount for the payment transaction, fraud scores provided by the transaction processing server 712, and other considerations that will be apparent to persons having skill in the relevant art. The issuing financial institution 702 may modify the authorization request to include a response code indicating approval (e.g., or denial if the transaction is to be denied) of the payment transaction. The issuing financial institution 702 may also modify a message type indicator for the transaction message to indicate that the transaction message is changed to be an authorization response. In step 742, the issuing financial institution 740 may transmit (e.g., via a transaction processor) the authorization response to the transaction processing server 712.

In step 744, the transaction processing server 712 may forward the authorization response to the acquiring financial institution 710 (e.g., via a transaction processor). In step 746, the acquiring financial institution may generate a response message indicating approval or denial of the payment transaction as indicated in the response code of the authorization response, and may transmit the response message to the gateway processor 708 using the standards and protocols set forth by the gateway processor 708. In step 748, the gateway processor 708 may forward the response message to the merchant 706 using the appropriate standards and protocols. In step 770, the merchant 706 may then provide the products purchased by the consumer 704 as part of the payment transaction to the consumer 704.

In some embodiments, once the process 700 has completed, payment from the issuing financial institution 702 to the acquiring financial institution 710 may be performed. In some instances, the payment may be made immediately or within one business day. In other instances, the payment may be made after a period of time, and in response to the submission of a clearing request from the acquiring financial institution 710 to the issuing financial institution 702 via the transaction processing server 702. In such instances, clearing requests for multiple payment transactions may be aggregated into a single clearing request, which may be used by the transaction processing server 712 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 740), the transaction processing server 712 may be configured to perform authorization of transactions on behalf of the issuing financial institution. Such actions may be referred to as "stand-in processing," where the transaction processing server "stands in" as the issuing financial institution 702. In such instances, the transaction processing server 712 may utilize rules set forth by the issuing financial institution 702 to determine approval or denial of the payment transaction, and may modify the transaction message accordingly prior to forwarding to the acquiring financial institution 710 in step 744. The transaction processing server 712 may retain data associated with transactions for which the transaction processing server 712 stands in, and may transmit the retained data to the issuing financial institution 702 once communication is reestablished. The issuing financial institution 702 may then process transaction accounts accordingly to accommodate for the time of lost communication.

In another example, if the transaction processing server 712 is unavailable for submission of the authorization request by the acquiring financial institution 710, then the transaction processor at the acquiring financial institution 710 may be configured to perform the processing of the transaction processing server 712 and the issuing financial institution 702. The transaction processor may include rules and data suitable for use in making a determination of approval or denial of the payment transaction based on the data included therein. For instance, the issuing financial institution 702 and/or transaction processing server 712 may set limits on transaction type, transaction amount, etc. that may be stored in the transaction processor and used to determine approval or denial of a payment transaction based thereon. In such instances, the acquiring financial institution 710 may receive an authorization response for the payment transaction even if the transaction processing server 712 is unavailable, ensuring that transactions are processed and no downtime is experienced even in instances where communication is unavailable. In such cases, the transaction processor may store transaction details for the payment transactions, which may be transmitted to the transaction processing server 712 (e.g., and from there to the associated issuing financial institutions 702) once communication is reestablished.

In some embodiments, transaction processors may be configured to include a plurality of different communication channels, which may utilize multiple communication cards and/or devices, to communicate with the transaction processing server 712 for the sending and receiving of transaction messages. For example, a transaction processor may be comprised of multiple computing devices, each having multiple communication ports that are connected to the transaction processing server 712. In such embodiments, the transaction processor may cycle through the communication channels when transmitting transaction messages to the transaction processing server 712, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 710 may identify that an authorization request involves an issuing financial institution 702 (e.g., via the bank identification number included in the transaction message) for which no value-added services are required. The transaction processor at the acquiring financial institution 710 may then transmit the authorization request directly to the transaction processor at the issuing financial institution 702 (e.g., without the authorization request passing through the transaction processing server 712), where the issuing financial institution 702 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 712 for processing. The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 708, acquiring financial institution 710, etc.) for processing using this advanced network, and to quickly and efficiently receive a response regarding the ability for a consumer 704 to fund the payment transaction.

Computer System Architecture

Figure 8:
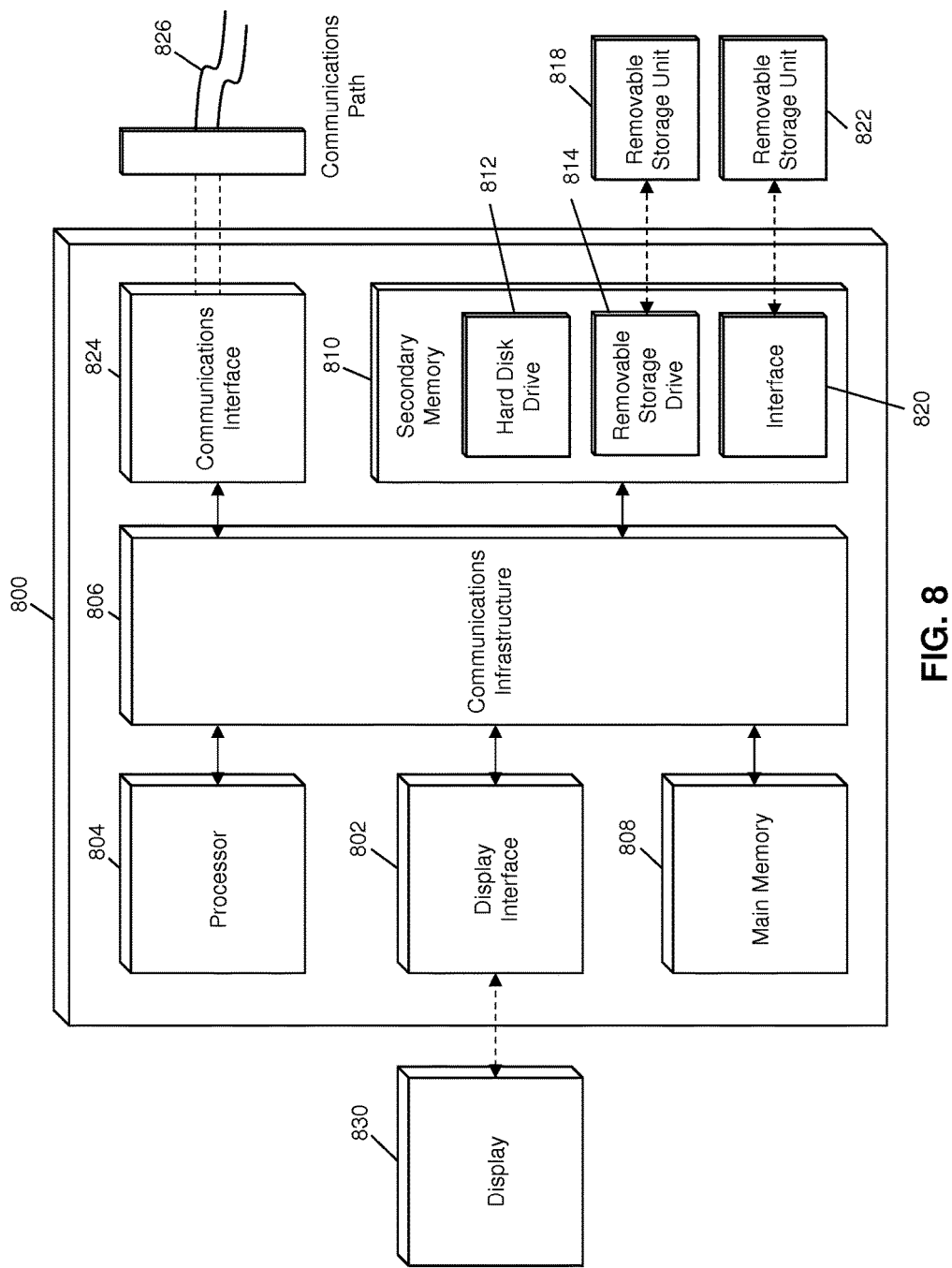
FIG. 8 is a block diagram illustrating a computer system architecture in accordance with exemplary embodiments.

FIG. 8 illustrates a computer system 800 in which embodiments of the present disclosure, or portions thereof, may be implemented as computer-readable code. For example, the processing server 102 of FIG. 1 may be implemented in the computer system 800 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-7.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 818, a removable storage unit 822, and a hard disk installed in hard disk drive 812.

Various embodiments of the present disclosure are described in terms of this example computer system 800. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 804 may be a special purpose or a general purpose processor device specifically configured to perform the functions discussed herein. The processor device 804 may be connected to a communications infrastructure 806, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 800 may also include a main memory 808 (e.g., random access memory, read-only memory, etc.), and may also include a secondary memory 810. The secondary memory 810 may include the hard disk drive 812 and a removable storage drive 814, such as a floppy disk drive, a magnetic tape drive, an optical disk drive, a flash memory, etc.

The removable storage drive 814 may read from and/or write to the removable storage unit 818 in a well-known manner. The removable storage unit 818 may include a removable storage media that may be read by and written to by the removable storage drive 814. For example, if the removable storage drive 814 is a floppy disk drive or universal serial bus port, the removable storage unit 818 may be a floppy disk or portable flash drive, respectively. In one embodiment, the removable storage unit 818 may be non-transitory computer readable recording media.

In some embodiments, the secondary memory 810 may include alternative means for allowing computer programs or other instructions to be loaded into the computer system 800, for example, the removable storage unit 822 and an interface 820. Examples of such means may include a program cartridge and cartridge interface (e.g., as found in video game systems), a removable memory chip (e.g., EEPROM, PROM, etc.) and associated socket, and other removable storage units 822 and interfaces 820 as will be apparent to persons having skill in the relevant art.

Data stored in the computer system 800 (e.g., in the main memory 808 and/or the secondary memory 810) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 800 may also include a communications interface 824. The communications interface 824 may be configured to allow software and data to be transferred between the computer system 800 and external devices. Exemplary communications interfaces 824 may include a modem, a network interface (e.g., an Ethernet card), a communications port, a PCMCIA slot and card, etc. Software and data transferred via the communications interface 824 may be in the form of signals, which may be electronic, electromagnetic, optical, or other signals as will be apparent to persons having skill in the relevant art. The signals may travel via a communications path 826, which may be configured to carry the signals and may be implemented using wire, cable, fiber optics, a phone line, a cellular phone link, a radio frequency link, etc.

The computer system 800 may further include a display interface 802. The display interface 802 may be configured to allow data to be transferred between the computer system 800 and external display 830. Exemplary display interfaces 802 may include high-definition multimedia interface (HDMI), digital visual interface (DVI), video graphics array (VGA), etc. The display 830 may be any suitable type of display for displaying data transmitted via the display interface 802 of the computer system 800, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 808 and secondary memory 810, which may be memory semiconductors (e.g., DRAMs, etc.). These computer program products may be means for providing software to the computer system 800. Computer programs (e.g., computer control logic) may be stored in the main memory 808 and/or the secondary memory 810. Computer programs may also be received via the communications interface 824. Such computer programs, when executed, may enable computer system 800 to implement the present methods as discussed herein. In particular, the computer programs, when executed, may enable processor device 804 to implement the methods illustrated by FIGS. 3-7, as discussed herein. Accordingly, such computer programs may represent controllers of the computer system 800. Where the present disclosure is implemented using software, the software may be stored in a computer program product and loaded into the computer system 800 using the removable storage drive 814, interface 820, and hard disk drive 812, or communications interface 824.

The processor device 804 may comprise one or more modules or engines configured to perform the functions of the computer system 800. Each of the modules or engines may be implemented using hardware and, in some instances, may also utilize software, such as corresponding to program code and/or programs stored in the main memory 808 or secondary memory 810. In such instances, program code may be compiled by the processor device 804 (e.g., by a compiling module or engine) prior to execution by the hardware of the computer system 800. For example, the program code may be source code written in a programming language that is translated into a lower level language, such as assembly language or machine code, for execution by the processor device 804 and/or any additional hardware components of the computer system 800. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 800 to perform the functions disclosed herein. It will be apparent to persons having skill in the relevant art that such processes result in the computer system 800 being a specially configured computer system 800 uniquely programmed to perform the functions discussed above.

Techniques consistent with the present disclosure provide, among other features, systems and methods for communicating an index of service performance based on gratuity values. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for communicating an index of service performance based on gratuity value, comprising:
communicating, by a receiving device of a processing server, with a payment network, via payment rails, and receiving a plurality of transaction messages therefrom, wherein (i) said processing server is positioned within the communication path between merchants and issuers, and (ii) said payment rails are specialized infrastructure associated with the payment network;
storing, in a transaction database of the processing server, the plurality of transaction messages received from the payment network via the payment rails, wherein each transaction message is formatted pursuant to International Organization of Standardization's ISO 8583 standard and includes a plurality of data elements, including at least a first data element configured to store a merchant identifier associated with a merchant involved in the related payment transaction and a second data element configured to store a transaction amount, addendum data, a message type indicator indicative of a type for the transaction message, and one or more bitmaps;
receiving, by the receiving device of the processing server, an electrical signal superimposed with a data request including at least a specific merchant identifier;
executing, by a processing device of the processing server, a query on the transaction database to identify a subset of transaction messages where the merchant identifier stored in the first data element corresponds to the specific merchant identifier included in the received data request;
identifying, by the processing device of the processing server, a tip amount for each transaction message in the identified subset, wherein identifying the tip amount includes one of:
(i) extracting, from the addendum data included in the respective transaction message, the tip amount, or
(ii) executing a query on a clearing database of the processing server to identify a clearing record associated with the respective transaction message, and calculating the tip amount based on the transaction amount stored in the second data element included in the respective transaction message and a transaction amount stored in the associated clearing record;
calculating, by the processing device of the processing server, an average gratuity index for a merchant associated with the specific merchant identifier as an average of the tip amount identified for each transaction message in the identified subset;
superimposing, by a transmitting device of the processing server, a data signal with at least the calculated average gratuity index; and
electronically transmitting, by the transmitting device of the processing server, the data signal superimposed with at least the calculated average gratuity index in response to the received data request.

2. The method of claim 1, further comprising:
repeating the executing, identifying, and calculating steps for each of a plurality of additional merchant identifiers; and
identifying, by the processing device of the processing server, a benchmark value based on the calculated average gratuity index for the merchant as compared to the average gratuity index calculated for each of the plurality of additional merchant identifiers, wherein the data signal further comprises the identified benchmark value.

3. The method of claim 2, wherein each of the plurality of additional merchant identifiers is associated with a merchant included in a geographic area including the merchant associated with the specific merchant identifier.

4. The method of claim 1, wherein
each transaction message is associated with a transaction identifier included in the transaction database,
each clearing record in the clearing database is associated with a transaction identifier included in the clearing database, and
identification of a clearing record associated with the respective transaction message is based on correspondence between the transaction identifier associated with the clearing record and the transaction identifier associated with the respective transaction message.

5. The method of claim 1, wherein
each transaction message further includes a third data element configured to store a transaction date;
the data request further includes a range of dates; and
the transaction date stored in the third data element included in each transaction message in the identified subset is within the range of dates.

6. A method for communicating an index of service performance based on gratuity value, comprising:
communicating, by a receiving device of a processing server, with a payment network, via payment rails, and receiving a plurality of transaction messages therefrom, wherein (i) said processing server is positioned within the communication path between merchants and issuers, and (ii) said payment rails are specialized infrastructure associated with the payment network;
storing, in a transaction database of the processing server, the plurality of transaction messages received from the payment network via the payment rails, wherein each transaction message is formatted pursuant to International Organization of Standardization's ISO 8583 standard and includes a plurality of data elements, including at least a first data element configured to store a merchant identifier associated with a merchant involved in the related payment transaction and a second data element configured to store a transaction amount, addendum data, a message type indicator indicative of a type for the transaction message, and one or more bitmaps;
receiving, by the receiving device of the processing server, an electrical signal superimposed with a data request including at least a specific merchant identifier;
executing, by a processing device of the processing server, a query on the transaction database to identify a subset of transaction messages where the merchant identifier stored in the first data element corresponds to the specific merchant identifier included in the received data request;
identifying, by the processing device of the processing server, a tip amount for each transaction message in the identified subset, wherein identifying the tip amount includes one of:
(i) extracting, from the addendum data included in the respective transaction message, the tip amount, or (ii) executing a query on a clearing database of the processing server to identify a clearing record associated with the respective transaction message, and calculating the tip amount based on the transaction amount stored in the second data element included in the respective transaction message and a transaction amount stored in the associated clearing record;

calculating, by the processing device of the processing server, a variance gratuity index for a merchant associated with the specific merchant identifier based on a variance in the tip amount identified for each transaction message in the identified subset;

superimposing, by a transmitting device of the processing server, a data signal with at least the calculated variance gratuity index; and electronically transmitting, by the transmitting device of the processing server, the data signal superimposed with at least the calculated variance gratuity index in response to the received data request.

7. The method of claim 6, further comprising:
repeating the executing, identifying, and calculating steps for each of a plurality of additional merchant identifiers; and
identifying, by the processing device of the processing server, a benchmark value based on the calculated variance gratuity index for the merchant as compared to the variance gratuity index calculated for each of the plurality of additional merchant identifiers, wherein
the data signal further comprises the identified benchmark value.

8. The method of claim 7, wherein each of the plurality of additional merchant identifiers is associated with a merchant included in a geographic area including the merchant associated with the specific merchant identifier.

9. The method of claim 1, wherein
each transaction message is associated with a transaction identifier included in the transaction database,
each clearing record in the clearing database is associated with a transaction identifier included in the clearing database, and
identification of a clearing record associated with the respective transaction message is based on correspondence between the transaction identifier associated with the clearing record and the transaction identifier associated with the respective transaction message.

10. The method of claim 1, wherein
each transaction message further includes a third data element configured to store a transaction date;
the data request further includes a range of dates; and
the transaction date stored in the third data element included in each transaction message in the identified subset is within the range of dates.

11. A system for communicating an index of service performance based on gratuity value, comprising:
a receiving device, of a processing server, configured to (i) communicate with a payment network, via payment rails, and receive a plurality of transaction messages therefrom, and (ii) receive an electrical signal comprising a data request including at least a specific merchant identifier, wherein (i) said processing server is positioned within the communication path between merchants and issuers, and (ii) said payment rails are specialized infrastructure associated with the payment network;
a transaction database, of the processing server, configured to store the plurality of transaction messages received from the payment network via the payment rails, wherein each transaction message is formatted pursuant to International Organization of Standardization's ISO 8583 standard and includes a plurality of data elements, including at least a first data element configured to store a merchant identifier associated with a merchant involved in the related payment transaction and a second data element configured to store a transaction amount, addendum data, a message type indicator indicative of a type for the transaction message, and one or more bitmaps;
a processing device of the processing server configured to:
execute a query on the transaction database to identify a subset of transaction messages where the merchant identifier stored in the first data element corresponds to the specific merchant identifier included in the received data request,
identify a tip amount for each transaction message in the identified subset, wherein identifying the tip amount includes one of:
(i) extracting, from the addendum data included in the respective transaction message, the tip amount, or
(ii) executing a query on a clearing database of the processing server to identify a clearing record associated with the respective transaction message, and calculating the tip amount based on the transaction amount stored in the second data element included in the respective transaction message and a transaction amount stored in the associated clearing record, and
calculate an average gratuity index for a merchant associated with the specific merchant identifier as an average of the tip amount identified for each transaction message in the identified subset; and
a transmitting device, of the processing server, configured to (i) superimpose a data signal with at least the calculated average gratuity index and (ii) electronically transmit the data signal superimposed with at least the calculated average gratuity index in response to the received data request.

12. The system of claim 11, wherein the processing device of the processing server is further configured to
repeat the executing, identifying, and calculating steps for each of a plurality of additional merchant identifiers, and
identify a benchmark value based on the calculated average gratuity index for the merchant as compared to the average gratuity index calculated for each of the plurality of additional merchant identifiers, wherein
the data signal further comprises the identified benchmark value.

13. The system of claim 12, wherein each of the plurality of additional merchant identifiers is associated with a merchant included in a geographic area including the merchant associated with the specific merchant identifier.

14. The system of claim 11, wherein
each transaction message is associated with a transaction identifier included in the transaction database,
each clearing record in the clearing database is associated with a transaction identifier included in the clearing database, and
identification of a clearing record associated with the respective transaction message is based on correspondence between the transaction identifier associated with the clearing record and the transaction identifier associated with the respective transaction message.

15. The system of claim 11, wherein
each transaction message further includes a third data element configured to store a transaction date;
the data request further includes a range of dates; and
the transaction date stored in the third data element included in each transaction message in the identified subset is within the range of dates.

16. A system for communicating an index of service performance based on gratuity value, comprising:
a receiving device, of a processing server, configured to (i) communicate with a payment network, via payment rails, and receive a plurality of transaction messages therefrom, and (ii) receive an electrical signal comprising a data request including at least a specific merchant identifier, wherein (i) said processing server is positioned within the communication path between merchants and issuers, and (ii) said payment rails are specialized infrastructure associated with the payment network;
a transaction database, of the processing server, configured to store the plurality of transaction messages received from the payment network via the payment rails, wherein each transaction message is formatted pursuant to International Organization of Standardization's ISO 8583 standard and includes a plurality of data elements, including at least a first data element configured to store a merchant identifier associated with a merchant involved in the related payment transaction and a second data element configured to store a transaction amount, addendum data, a message type indicator indicative of a type for the transaction message, and one or more bitmaps;
a processing device, of the processing server, configured to:
execute a query on the transaction database to identify a subset of transaction messages where the merchant identifier stored in the first data element corresponds to the specific merchant identifier included in the received data request,
identify a tip amount for each transaction message in the identified subset, wherein identifying the tip amount includes one of:
(i) extracting, from the addendum data included in the respective transaction message, the tip amount, or
(ii) executing a query on a clearing database of the processing server to identify a clearing record associated with the respective transaction message, and calculating the tip amount based on the transaction amount stored in the second data element included in the respective transaction message and a transaction amount stored in the associated clearing record, and
calculate a variance gratuity index for a merchant associated with the specific merchant identifier as a variance of the tip amount identified for each transaction message in the identified subset; and
a transmitting device, of the processing server, configured to (i) superimpose a data signal with at least the calculated variance gratuity index, and (ii) electronically transmit the data signal superimposed with at least the calculated variance gratuity index in response to the received data request.

17. The system of claim 16, wherein the processing device of the processing server is further configured to
repeat the executing, identifying, and calculating steps for each of a plurality of additional merchant identifiers, and
identify a benchmark value based on the calculated variance gratuity index for the merchant as compared to the variance gratuity index calculated for each of the plurality of additional merchant identifiers, wherein
the data signal further comprises the identified benchmark value.

18. The system of claim 17, wherein each of the plurality of additional merchant identifiers is associated with a merchant included in a geographic area including the merchant associated with the specific merchant identifier.

19. The system of claim 16, wherein
each transaction message is associated with a transaction identifier included in the transaction database,
each clearing record in the clearing database is associated with a transaction identifier included in the clearing database, and
identification of a clearing record associated with the respective transaction message is based on correspondence between the transaction identifier associated with the clearing record and the transaction identifier associated with the respective transaction message.

20. The system of claim 16, wherein
each transaction message further includes a third data element configured to store a transaction date;
the data request further includes a range of dates; and
the transaction date stored in the third data element included in each transaction message in the identified subset is within the range of dates.

* * * * *